United States Patent
Propheter-Hinckley et al.

(10) Patent No.: US 10,968,753 B1
(45) Date of Patent: Apr. 6, 2021

(54) AIRFOIL HAVING IMPINGEMENT LEADING EDGE

(71) Applicant: United Technologies Corporation, Farmington, CT (US)

(72) Inventors: Tracy A. Propheter-Hinckley, Manchester, CT (US); Carey Clum, East Hartford, CT (US); Timothy J. Jennings, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 51 days.

(21) Appl. No.: 16/552,450

(22) Filed: Aug. 27, 2019

Related U.S. Application Data

(63) Continuation of application No. 15/791,464, filed on Oct. 24, 2017, now Pat. No. 10,584,593.

(51) Int. Cl.
*F01D 5/18* (2006.01)
*F01D 5/14* (2006.01)

(52) U.S. Cl.
CPC ............. *F01D 5/186* (2013.01); *F01D 5/141* (2013.01); *F01D 5/187* (2013.01); *F05D 2220/32* (2013.01); *F05D 2240/121* (2013.01); *F05D 2240/303* (2013.01); *F05D 2260/201* (2013.01); *F05D 2260/202* (2013.01)

(58) Field of Classification Search
CPC .......... F01D 5/186; F01D 5/187; F01D 5/141; F05D 2220/32; F05D 2240/121; F05D 2240/303; F05D 2260/201; F05D 2260/202
See application file for complete search history.

(56) References Cited

U.S. PATENT DOCUMENTS

| | | | |
|---|---|---|---|
| 6,099,251 | A | 8/2000 | Lafleur |
| 6,164,912 | A | 12/2000 | Tabbita et al. |
| 6,210,112 | B1 | 4/2001 | Tabbita et al. |
| 6,629,817 | B2 | 10/2003 | Shelton et al. |
| 6,955,522 | B2 | 10/2005 | Cunha et al. |

(Continued)

FOREIGN PATENT DOCUMENTS

| | | |
|---|---|---|
| EP | 1467064 A1 | 10/2004 |
| EP | 3241991 A1 | 11/2017 |

OTHER PUBLICATIONS

European Search Report for European Application No. 18202304.4, International Filing Date Oct. 24, 2018, dated Apr. 17, 2019, 9 pages.

*Primary Examiner* — J. Todd Newton
*Assistant Examiner* — Sabbir Hasan
(74) *Attorney, Agent, or Firm* — Cantor Colburn LLP

(57) ABSTRACT

Airfoils for a gas turbine engines and gas turbine engines are described. The airfoils include an airfoil body extending in a radial direction from a first end to a second end, and axially from a leading edge to a trailing edge. A radially extending leading edge channel is formed in the leading edge of the airfoil body, having first and second channel walls that join at a channel base. A first leading edge impingement cavity is located within the airfoil body proximate the leading edge and is defined, in part, by the first channel wall. A leading edge feed cavity is arranged aft of the first leading edge impingement cavity to supply air into the first leading edge impingement cavity. A first leading edge impingement hole is formed in the first channel wall and angled toward a portion of the second channel wall.

20 Claims, 4 Drawing Sheets

(56) References Cited

U.S. PATENT DOCUMENTS

| | | | |
|---|---|---|---|
| 8,061,981 | B2 | 11/2011 | Groth et al. |
| 9,022,737 | B2 | 5/2015 | Piggush et al. |
| 2003/0007864 | A1 | 1/2003 | Shelton et al. |
| 2016/0273365 | A1 | 9/2016 | Slavens et al. |
| 2019/0120063 | A1 | 4/2019 | Propheter-Hinckley et al. |

AIRFOIL HAVING IMPINGEMENT LEADING EDGE

CROSS REFERENCE TO RELATED APPLICATIONS

This application is a continuation application of U.S. application Ser. No. 15/791,464 filed Oct. 24, 2017, the contents of which are incorporated by reference herein in their entirety.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling for an airfoil may be desirable.

BRIEF DESCRIPTION

According to some embodiments, airfoils for gas turbine engines are provided. The airfoils have an airfoil body extending in a radial direction from a first end to a second end, and extending axially from a leading edge to a trailing edge, a leading edge channel formed in the leading edge of the airfoil body, the leading edge channel having a first channel wall and a second channel wall that join at a channel base to define the leading edge channel, the leading edge channel extending in a radial direction along the leading edge of the airfoil body, a first leading edge impingement cavity located within the airfoil body proximate the leading edge, wherein the first channel wall forms a portion of the airfoil body defining the first leading edge impingement cavity, a second leading edge impingement cavity located within the airfoil body proximate the leading edge, wherein the second channel wall forms a portion of the airfoil body defining the second leading edge impingement cavity, and a first leading edge impingement hole formed in the first channel wall and angled such that air flowing from the first leading edge impingement cavity and through the first leading edge impingement hole impinges upon a portion of the second channel wall.

In addition to one or more of the features described herein, or as an alternative, further embodiments of the airfoils may include that the first end is a root of the airfoil body and the second end is a tip of the airfoil, wherein the leading edge channel extends less than a full length of a distance between the root and the tip along the leading edge of the airfoil body.

In addition to one or more of the features described herein, or as an alternative, further embodiments of the airfoils may include a second leading edge impingement hole formed in the second channel wall and angled such that air flowing from the second leading edge impingement cavity and through the second leading edge impingement hole impinges upon a portion of the first channel wall.

In addition to one or more of the features described herein, or as an alternative, further embodiments of the airfoils may include that the leading edge channel comprises a plurality of first leading edge impingement holes formed in the first channel wall, wherein the plurality of first leading edge impingement holes extend in an array radially along the first channel wall, and wherein the leading edge channel comprises a plurality of second leading edge impingement holes formed in the second channel wall, wherein the plurality of second leading edge impingement holes extend in an array radially along the second channel wall.

In addition to one or more of the features described herein, or as an alternative, further embodiments of the airfoils may include a leading edge feed cavity arranged aft of the first and second leading edge impingement cavities and arranged to supply air into at least one of the first leading edge impingement cavity and the second leading edge impingement cavity.

In addition to one or more of the features described herein, or as an alternative, further embodiments of the airfoils may include that the leading edge feed cavity supplies air into both of the first leading edge impingement cavity and the second leading edge impingement cavity.

In addition to one or more of the features described herein, or as an alternative, further embodiments of the airfoils may include that the leading edge channel had a depth in an axial direction that is at least twice a diameter of the first leading edge impingement hole.

In addition to one or more of the features described herein, or as an alternative, further embodiments of the airfoils may include that the leading edge channel comprises a plurality of first leading edge impingement holes formed in the first channel wall, wherein the plurality of first leading edge impingement holes extend in an array radially along the first channel wall.

In addition to one or more of the features described herein, or as an alternative, further embodiments of the airfoils may include at least one additional channel formed on an exterior surface of the airfoil and extending radially.

In addition to one or more of the features described herein, or as an alternative, further embodiments of the airfoils may include that the airfoil body forms a blade of a turbine section of the gas turbine engine.

According to some embodiments, gas turbine engines are provided. The gas turbine engines include an airfoil having an airfoil body extending in a radial direction from a first end to a second end, and extending axially from a leading edge to a trailing edge, a leading edge channel formed in the leading edge of the airfoil body, the leading edge channel having a first channel wall and a second channel wall that join at a channel base to define the leading edge channel, the leading edge channel extending in a radial direction along the leading edge of the airfoil body, a first leading edge impingement cavity located within the airfoil body proximate the leading edge, wherein the first channel wall forms a portion of the airfoil body defining the first leading edge impingement cavity, a second leading edge impingement cavity located within the airfoil body proximate the leading edge, wherein the second channel wall forms a portion of the airfoil body defining the second leading edge impingement cavity, and a first leading edge impingement hole formed in the first channel wall and angled such that air flowing from the first leading edge impingement cavity and through the first leading edge impingement hole impinges upon a portion of the second channel wall.

In addition to one or more of the features described herein, or as an alternative, further embodiments of the gas turbine engines may include that the first end is a root of the airfoil body and the second end is a tip of the airfoil, wherein the leading edge channel extends less than a full length of a distance between the root and the tip along the leading edge of the airfoil body.

In addition to one or more of the features described herein, or as an alternative, further embodiments of the gas turbine engines may include a second leading edge impingement hole formed in the second channel wall and angled such that air flowing from the second leading edge impingement cavity and through the second leading edge impingement hole impinges upon a portion of the first channel wall.

In addition to one or more of the features described herein, or as an alternative, further embodiments of the gas turbine engines may include that the leading edge channel comprises a plurality of first leading edge impingement holes formed in the first channel wall, wherein the plurality of first leading edge impingement holes extend in an array radially along the first channel wall, and wherein the leading edge channel comprises a plurality of second leading edge impingement holes formed in the second channel wall, wherein the plurality of second leading edge impingement holes extend in an array radially along the second channel wall.

In addition to one or more of the features described herein, or as an alternative, further embodiments of the gas turbine engines may include a leading edge feed cavity arranged aft of the first and second leading edge impingement cavities and arranged to supply air into at least one of the first leading edge impingement cavity and the second leading edge impingement cavity.

In addition to one or more of the features described herein, or as an alternative, further embodiments of the gas turbine engines may include that the leading edge feed cavity supplies air into both of the first leading edge impingement cavity and the second leading edge impingement cavity.

In addition to one or more of the features described herein, or as an alternative, further embodiments of the gas turbine engines may include that the leading edge channel had a depth in an axial direction that is at least twice a diameter of the first leading edge impingement hole.

In addition to one or more of the features described herein, or as an alternative, further embodiments of the gas turbine engines may include that the leading edge channel comprises a plurality of first leading edge impingement holes formed in the first channel wall, wherein the plurality of first leading edge impingement holes extend in an array radially along the first channel wall.

In addition to one or more of the features described herein, or as an alternative, further embodiments of the gas turbine engines may include at least one additional channel formed on an exterior surface of the airfoil and extending radially.

In addition to one or more of the features described herein, or as an alternative, further embodiments of the gas turbine engines may include that the airfoil is a blade of a turbine section of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
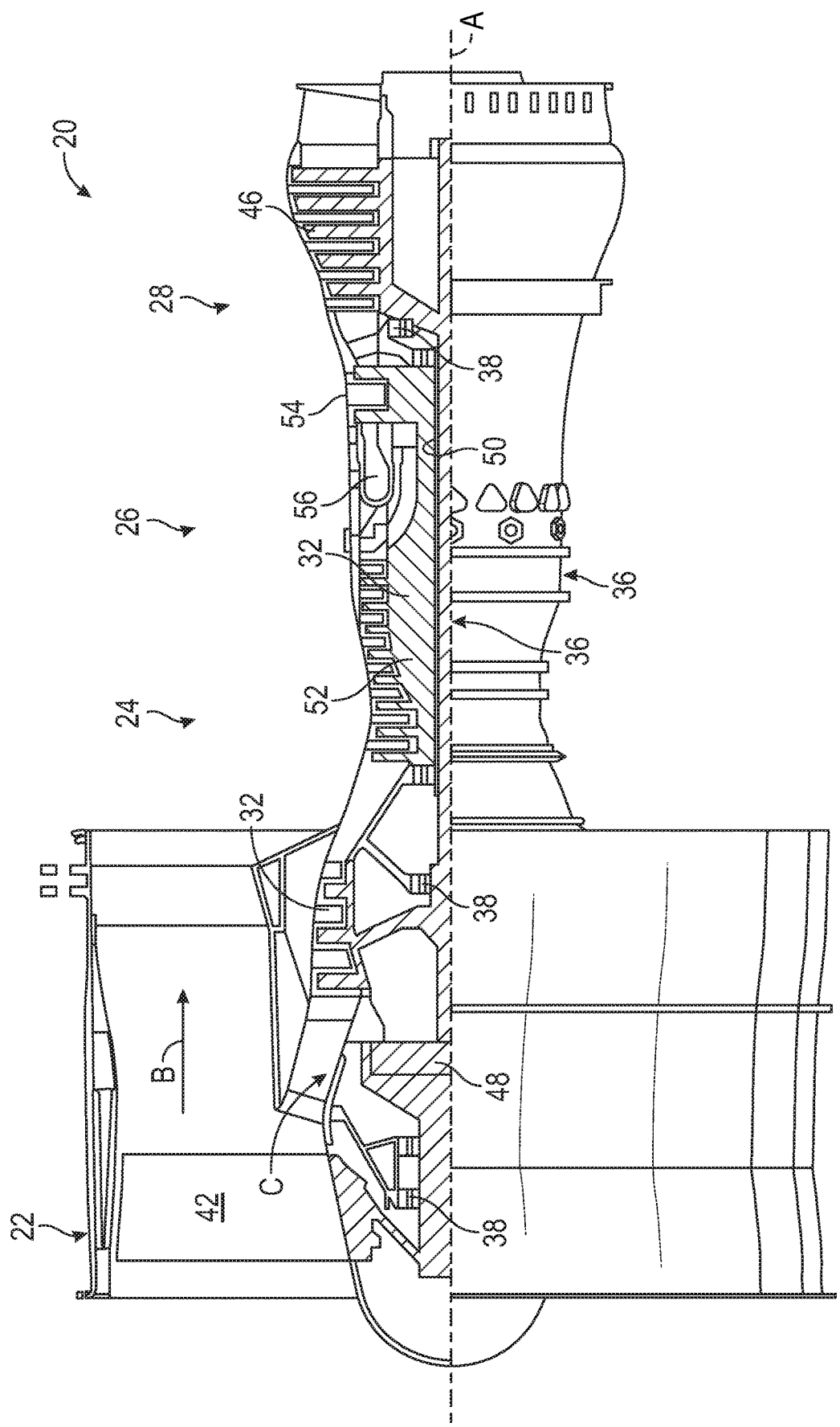
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
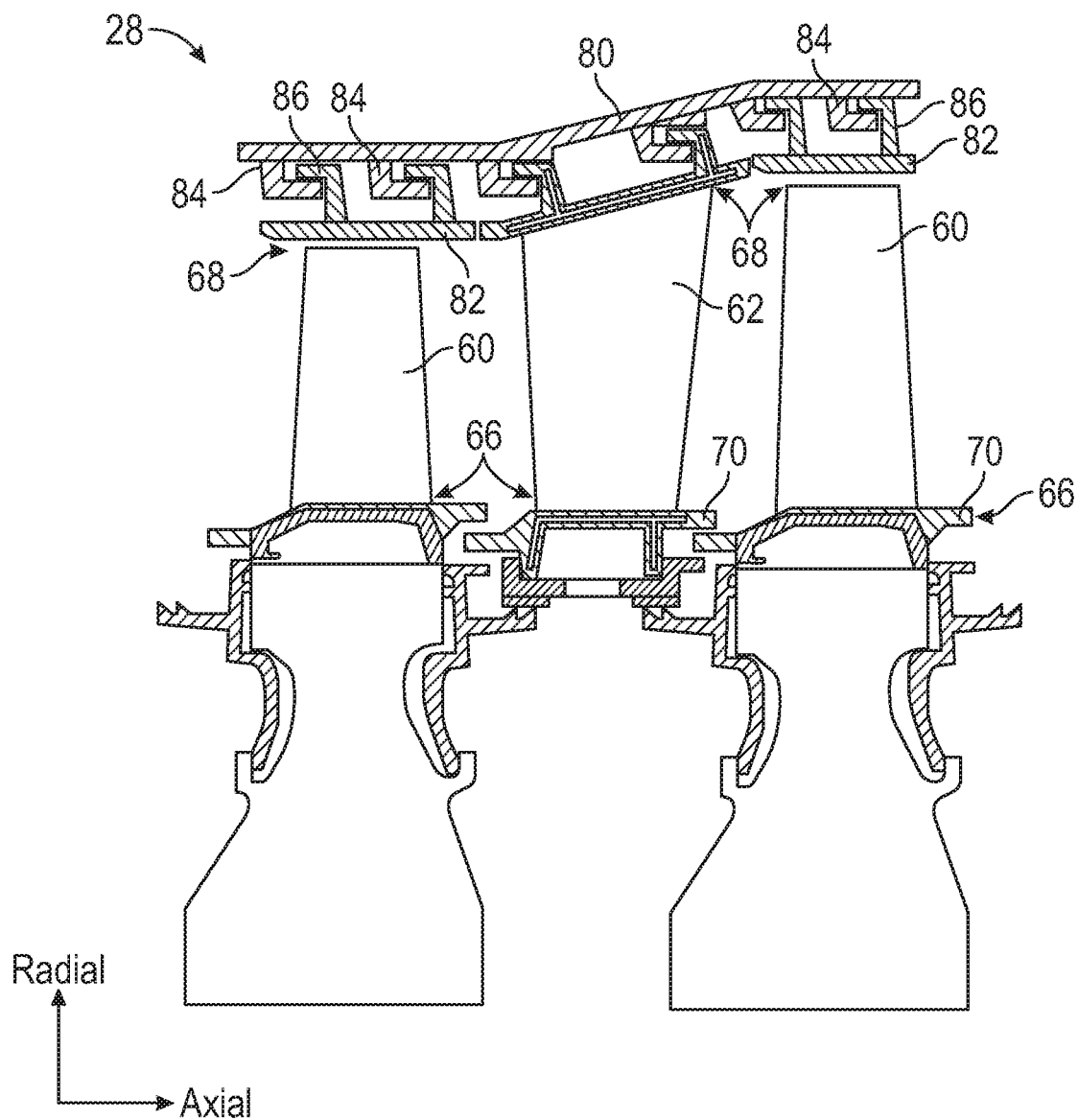
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

As shown and labeled in FIG. 2, a radial direction is upward on the page (e.g., radial with respect to an engine axis) and an axial direction is to the right on the page (e.g., along an engine axis). Thus, radial cooling flows will travel up or down on the page and axial flows will travel left-to-right (or vice versa).

Figure 3A:
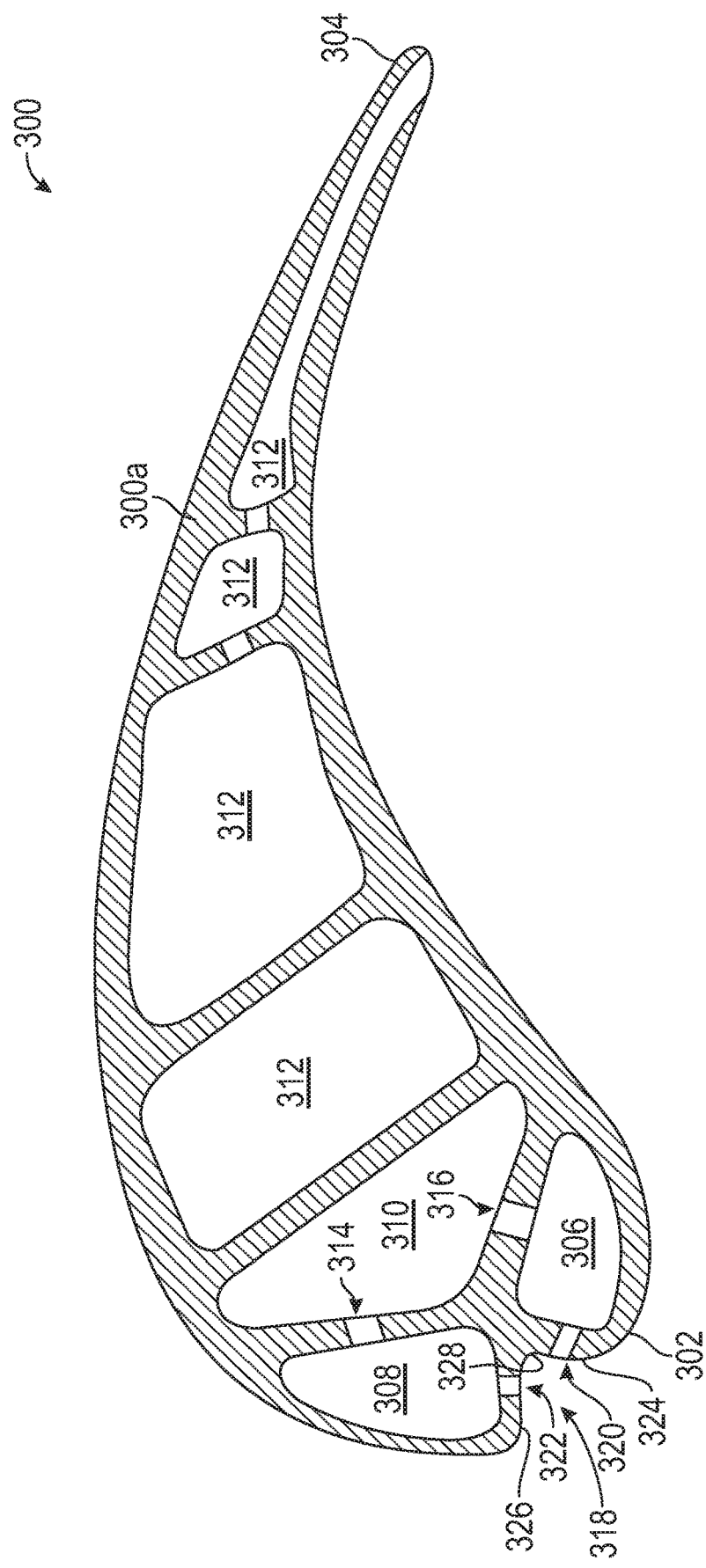
FIG. 3A is a schematic illustration of an airfoil in accordance with an embodiment of the present disclosure.
Figure 3B:
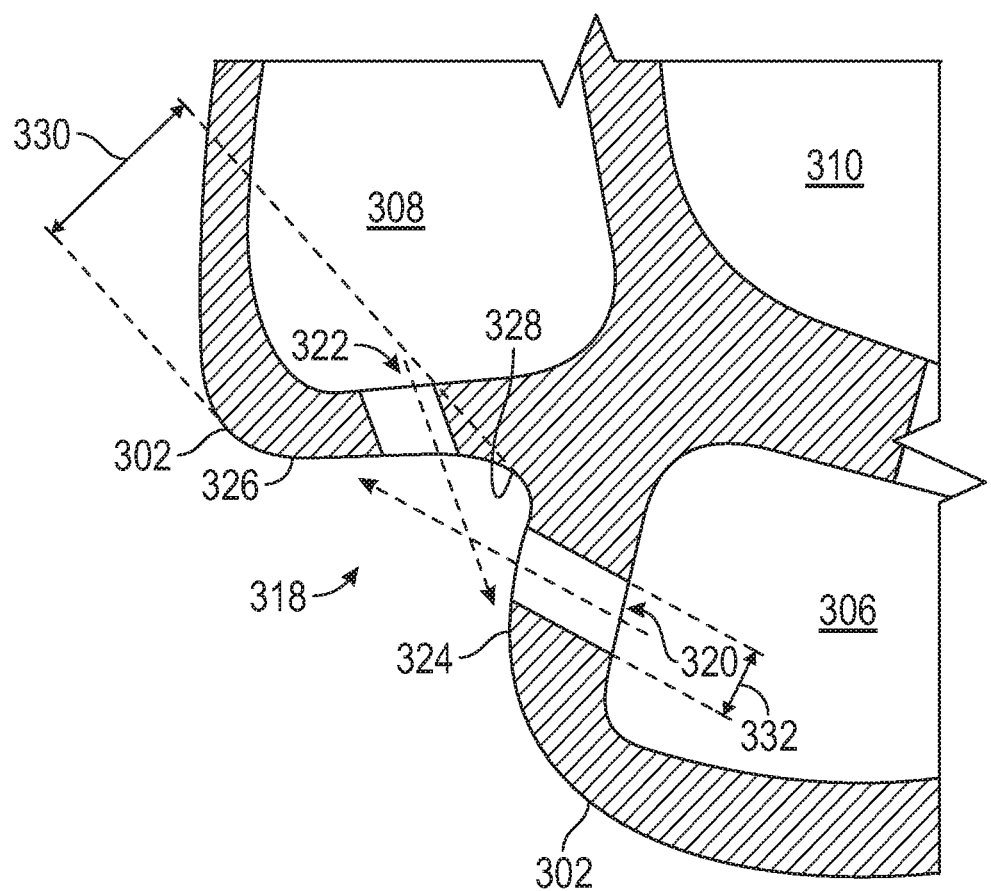
FIG. 3B is an enlarged illustration of a leading edge of the airfoil shown in FIG. 3A.

Turning to FIGS. 3A-3B, schematic illustrations of an airfoil 300 in accordance with an embodiment of the present disclosure are shown, with FIG. 3B being an enlarged illustration of a leading edge of the airfoil 300. The airfoil 300 is defined by an airfoil body 300a having a leading edge 302 and extends aftward to a trailing edge 304. The airfoil 300, as shown, has a first leading edge impingement cavity 306 and a second leading edge impingement cavity 308. Aft of the leading edge impingement cavities 306, 308 is a leading edge feed cavity 310. The airfoil 300 includes additional cooling cavities 312, as shown.

The leading edge impingement cavities 306, 308 are fed from the leading edge feed cavity 310 by one or more respective impingement holes that fluidly connect the leading edge feed cavity 310 leading edge impingement cavities 306, 308. For example, as shown, a first impingement hole 314 enables air from the leading edge feed cavity 310 to impinge into the first leading edge impingement cavity 306 and a second impingement hole 316 enables air from the leading edge feed cavity 310 to impinge into the second leading edge impingement cavity 308. The impinging air from the leading edge feed cavity 310 will provide cooling to the leading edge 302 of the airfoil 300.

As shown, the airfoil 300 includes a stagnation divot, hollow, trench, or channel (hereinafter "leading edge channel 318") which is positioned at the tip or front of the leading edge 302 of the airfoil 300. The leading edge channel 318, in some embodiments, extends from a root to a tip (e.g., along a radial length) of the airfoil 300, as will be appreciated by those of skill in the art. In other embodiments, the leading edge channel can extend over a partial extent of the radial length, e.g., less than a full length of a distance between the first end (e.g., root) and the second (e.g., tip) along the leading edge of the airfoil body. That is, in some embodiments, the leading edge channel may not extend along the entire radial length of the leading edge. For example, in one non-limiting embodiment, the leading edge channel may extend along about half of the radial length of the airfoil leading edge, with no channel present on the other half of the leading edge. In one such embodiment, the leading edge channel can extend from a tip of the airfoil in a radially downward direction and stop approximately at the halfway point. In other embodiments, the leading edge channel can be less-than-full-radial-distance in length, but positioned such that neither end of the channel is located at the root or tip (e.g., positioned at a mid-point or partial mid-point along the radial length of the leading edge of the airfoil). Further, in some embodiments, multiple less-than-full length leading edge channels can be formed on a leading edge of the airfoil, without departing from the scope of the present disclosure.

A portion of the air from the first and second leading edge impingement cavities 306, 308 will exit the respective first and second leading edge impingement cavities 306, 308 through leading edge impingement holes 320, 322. A first leading edge impingement hole 320 is formed in a first channel wall 324 that partially defines the first leading edge impingement cavity 306. A second leading edge impingement hole 322 is formed in a second channel wall 326 that partially defines the second leading edge impingement cavity 308. Although a single leading edge impingement hole is shown in the illustration of FIGS. 3A-3B, those of skill in the art will appreciate that an array of impingement holes can be formed extending along a radial extent of the airfoil 300 along the channel walls 324, 326 of the leading edge channel. The first channel wall 324 and the second channel wall 326 form and define the leading edge channel 318. A channel base 328 is formed where the first and second channel walls 324, 326 meet at the base of the leading edge channel 318.

Air from the first and second leading edge impingement cavities 306, 308 will flow into and/or impinge into the leading edge channel 318 along the leading edge 302. Once in the leading edge channel 318, the cooling air diffuses into cooling air already in the leading edge channel 318 and distributes spanwise along the leading edge channel 318. One of the advantages of distributing cooling air within the leading edge channel 318 is that the pressure difference problems characteristic of conventional cooling orifices are minimized. For example, the difference in pressure across a cooling orifice is a function of a local internal cavity pressure and a local gaspath gas pressure adjacent the orifice. Both of these pressures vary as a function of time. If the gaspath gas pressure is high and the internal cavity pressure is low adjacent a particular cooling orifice in a conventional scheme, undesirable hot core gas in-flow can occur (e.g., into one of the leading edge impingement or other cooling cavities). Embodiments provided herein can minimize the opportunity for the undesirable in-flow due to impingement air being distributed within the leading edge channel 318, thereby decreasing the opportunity for any low pressure zones to occur. Likewise, the distribution of cooling air within the leading edge channel 318 also avoids cooling air pressure spikes which, in a conventional scheme, can jet cooling air into the gaspath gas rather than add it to a film of cooling air downstream along exterior surfaces of the airfoil 300.

Additionally, air impinging from the leading edge impingement holes 320, 322 can provide impingement cooling to the opposing channel walls 324, 326. For example, as shown in FIG. 3B, air from the first leading edge impingement cavity 306 will flow through the first leading edge impingement hole 320 and impinge upon the second channel wall 326. Similarly, air from the second leading edge impingement cavity 308 will flow through the second leading edge impingement hole 322 and impinge upon the first channel wall 324. That is, the first leading edge impingement hole 320 is angled such that air passing through the first leading edge impingement hole 320 is directed such that air will impinge upon the material of the second channel wall 326 and the second leading edge impingement hole 322 is angled such that air passing through the second leading edge impingement hole 322 is directed such that air will impinge upon the material of the first channel wall 324.

In some embodiments, the leading edge channel 318 has a depth 330 that is at least twice the diameter 332 of the leading edge impingement holes 320, 322, as schematically shown. This dimension enables formation of the leading edge impingement holes 320, 322 within the channel walls 324, 326. The depth 330 is measured from the leading edge 302 to the channel base 328 of the leading edge channel 318.

Although shown herein with two leading edge impingement holes (one for each leading edge impingement cavity), those of skill in the art will appreciate that other arrangements are possible without departing from the scope of the present disclosure. For example, in some embodiments, one of the leading edge impingement holes can be omitted such that only one leading edge impingement hole is provided to supply air into the leading edge channel. Further, in some embodiment, multiple channels can be formed along the leading edge or other surfaces of the airfoil. In some such embodiments, each of the channels can be arranged with one or more impingement and/or feed holes to supply air into the channel, as will be appreciated by those of skill in the art. For example, in one non-limiting embodiment, a second channel can be formed on the exterior surface of the airfoil 300 adjacent the first leading edge impingement cavity 306 and the leading edge feed cavity 310, with the second channel being sourced from the first leading edge impingement cavity 306 and the leading edge feed cavity 310.

Embodiments provided herein are directed to airfoils having a leading edge channel that is supplied with impingement air from multiple different leading edge impingement cavities. Advantageously, such arrangement can enable the leading edge channel to be supplied with impingement air from any one (or more) of the leading edge impingement cavities, thus ensuring constant impinging air within the leading edge channel. Further, advantageously, embodiment provided herein are directed to angled impingement holes within the leading edge channel such that a portion of the impinging air that flows into the leading edge channel impinges upon and cools the material of the opposing channel wall.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body extending in a radial direction from a first end to a second end, and extending axially from a leading edge to a trailing edge;
    a leading edge channel formed in the leading edge of the airfoil body, the leading edge channel having a first channel wall and a second channel wall that join at a channel base to define the leading edge channel, the leading edge channel extending in a radial direction along the leading edge of the airfoil body;
    a first leading edge impingement cavity located within the airfoil body proximate the leading edge, wherein the first channel wall forms a portion of the airfoil body defining the first leading edge impingement cavity;
    a leading edge feed cavity arranged aft of the first leading edge impingement cavity and arranged to supply air into the first leading edge impingement cavity; and
    a first leading edge impingement hole formed in the first channel wall and angled such that air flowing from the first leading edge impingement cavity and through the first leading edge impingement hole impinges upon a portion of the second channel wall.

2. The airfoil of claim 1, wherein the first end is a root of the airfoil body and the second end is a tip of the airfoil, wherein the leading edge channel extends less than a full length of a distance between the root and the tip along the leading edge of the airfoil body.

3. The airfoil of claim 1, further comprising a second leading edge impingement cavity located within the airfoil body proximate the leading edge, wherein the second channel wall forms a portion of the airfoil body defining the second leading edge impingement cavity.

4. The airfoil of claim 3, further comprising a second leading edge impingement hole formed in the second channel wall and angled such that air flowing from the second leading edge impingement cavity and through the second leading edge impingement hole impinges upon a portion of the first channel wall.

5. The airfoil of claim 4, wherein the leading edge channel comprises a plurality of first leading edge impingement holes formed in the first channel wall, wherein the plurality of first leading edge impingement holes extend in an array radially along the first channel wall, and wherein the leading edge channel comprises a plurality of second leading edge impingement holes formed in the second channel wall, wherein the plurality of second leading edge impingement holes extend in an array radially along the second channel wall.

6. The airfoil of claim 3, wherein the leading edge feed cavity is arranged aft of the second leading edge impingement cavity and arranged to supply air into the second leading edge impingement cavity.

7. The airfoil of claim 1, wherein the leading edge channel has a depth in an axial direction that is at least twice a diameter of the first leading edge impingement hole.

8. The airfoil of claim 1, wherein the leading edge channel comprises a plurality of first leading edge impingement holes formed in the first channel wall, wherein the plurality of first leading edge impingement holes extend in an array radially along the first channel wall.

9. The airfoil of claim 1, further comprising at least one additional channel formed on an exterior surface of the airfoil and extending radially.

10. The airfoil of claim 1, wherein the airfoil body forms a blade of a turbine section of the gas turbine engine.

11. A gas turbine engine comprising:
    an airfoil having an airfoil body extending in a radial direction from a first end to a second end, and extending axially from a leading edge to a trailing edge;
    a leading edge channel formed in the leading edge of the airfoil body, the leading edge channel having a first channel wall and a second channel wall that join at a channel base to define the leading edge channel, the leading edge channel extending in a radial direction along the leading edge of the airfoil body;
    a first leading edge impingement cavity located within the airfoil body proximate the leading edge, wherein the first channel wall forms a portion of the airfoil body defining the first leading edge impingement cavity;
    a leading edge feed cavity arranged aft of the first leading edge impingement cavity and arranged to supply air into the first leading edge impingement cavity; and
    a first leading edge impingement hole formed in the first channel wall and angled such that air flowing from the first leading edge impingement cavity and through the first leading edge impingement hole impinges upon a portion of the second channel wall.

12. The gas turbine engine of claim 11, wherein the first end is a root of the airfoil body and the second end is a tip of the airfoil, wherein the leading edge channel extends less than a full length of a distance between the root and the tip along the leading edge of the airfoil body.

13. The gas turbine engine of claim 11, further comprising a second leading edge impingement cavity located within the airfoil body proximate the leading edge, wherein the second channel wall forms a portion of the airfoil body defining the second leading edge impingement cavity.

14. The gas turbine engine of claim 13, further comprising a second leading edge impingement hole formed in the second channel wall and angled such that air flowing from the second leading edge impingement cavity and through the second leading edge impingement hole impinges upon a portion of the first channel wall.

15. The gas turbine engine of claim 14, wherein the leading edge channel comprises a plurality of first leading edge impingement holes formed in the first channel wall, wherein the plurality of first leading edge impingement holes extend in an array radially along the first channel wall, and wherein the leading edge channel comprises a plurality of second leading edge impingement holes formed in the second channel wall, wherein the plurality of second leading edge impingement holes extend in an array radially along the second channel wall.

16. The gas turbine engine of claim 13, wherein the leading edge feed cavity is arranged aft of the second leading edge impingement cavity and arranged to supply air into the second leading edge impingement cavity.

17. The gas turbine engine of claim 11, wherein the leading edge channel has a depth in an axial direction that is at least twice a diameter of the first leading edge impingement hole.

18. The gas turbine engine of claim 11, wherein the leading edge channel comprises a plurality of first leading edge impingement holes formed in the first channel wall, wherein the plurality of first leading edge impingement holes extend in an array radially along the first channel wall.

19. The gas turbine engine of claim 11, further comprising at least one additional channel formed on an exterior surface of the airfoil and extending radially.

20. The gas turbine engine of claim 11, wherein the airfoil is a blade of a turbine section of the gas turbine engine.

* * * * *